US012644557B2

(12) United States Patent
Bothell

(10) Patent No.: US 12,644,557 B2
(45) Date of Patent: Jun. 2, 2026

(54) CONNECTOR SYSTEM FOR USE IN ULTRA-HIGH VACUUM SYSTEMS

(71) Applicant: Atlas Bimetals Labs, Inc., Port Townsend, WA (US)

(72) Inventor: Justin Chase Bothell, Port Townsend, WA (US)

(73) Assignee: Atlas Bimetals Labs, Inc., Port Townsend, WA (US)

( * ) Notice: Subject to any disclaimer, the term of this patent is extended or adjusted under 35 U.S.C. 154(b) by 97 days.

(21) Appl. No.: 18/495,644

(22) Filed: Oct. 26, 2023

(65) Prior Publication Data

US 2024/0052965 A1 Feb. 15, 2024

Related U.S. Application Data

(63) Continuation-in-part of application No. 18/306,226, filed on Apr. 24, 2023, now abandoned.

(60) Provisional application No. 63/363,475, filed on Apr. 22, 2022.

(51) Int. Cl.
F16L 58/18 (2006.01)

(52) U.S. Cl.
CPC ......... F16L 58/187 (2013.01); *F16L 2201/40* (2013.01)

(58) Field of Classification Search
CPC ..... F16L 58/187; F16L 2201/40; F16L 17/08; F16L 23/026; F16L 23/12; F16L 25/0072; F16L 23/024; B23P 11/00; B23P 17/02; B23K 20/08
USPC ....... 29/458, 527.2, 428, 592; 228/107, 205, 228/206, 4.1
See application file for complete search history.

(56) References Cited

U.S. PATENT DOCUMENTS

| | | | | |
|---|---|---|---|---|
| 3,298,719 A | * | 1/1967 | Bills | F16L 23/20 |
| | | | | 285/368 |
| 3,311,392 A | * | 3/1967 | Buschow | F16L 23/12 |
| | | | | 403/336 |
| 4,120,439 A | * | 10/1978 | Persson | B22F 7/04 |
| | | | | 29/421.2 |

(Continued)

FOREIGN PATENT DOCUMENTS

GB 2386578 A 11/2001

*Primary Examiner* — Sarang Afzali
*Assistant Examiner* — Darrell C Ford
(74) *Attorney, Agent, or Firm* — Umair A. Qadeer

(57) ABSTRACT

A connector for use in an ultra-high vacuum system is disclosed herein. The connector has a metal conduit section with a first hardness, a metal fitting with a second hardness greater than the first hardness, and a metallic reaction-inhibiting barrier positioned between the conduit section and the fitting to sealingly attach the fitting to the conduit section. In some embodiments, application of a mechanical stressor such as stretching or treatment with a mechanical oxide disruptor removes oxide from and prevents oxide re-formation on the faying surface of the conduit section. In alternate embodiments, oxide is removed from the faying surface of the conduit section and oxide re-formation is subsequently prevented by applying an oxide inhibitor. The reaction-inhibiting barrier substantially inhibits metallic and chemical interaction between the conduit section and the fitting under ultra-high vacuum, temperature cycling, mechanical stress, and reactive chemical conditions, as are present during manufacturing.

10 Claims, 4 Drawing Sheets

(56)               References Cited

U.S. PATENT DOCUMENTS

| | | | |
|---|---|---|---|
| 5,836,623 A | 11/1998 | Bothell et al. | |
| 9,581,245 B2 * | 2/2017 | Xi ........................... | F16L 23/20 |
| 2003/0162042 A1 * | 8/2003 | Kurisu ...................... | C23C 8/16 |
| | | | 428/472.1 |
| 2008/0296351 A1 * | 12/2008 | Crockett .............. | B23K 20/021 |
| | | | 228/164 |

* cited by examiner

CONNECTOR SYSTEM FOR USE IN ULTRA-HIGH VACUUM SYSTEMS

CROSS-REFERENCE TO RELATED APPLICATIONS

This application is a continuation-in-part of U.S. patent application Ser. No. 18/306,226, filed on Apr. 24, 2023, which claims the benefit of U.S. Provisional Patent Application Ser. No. 63/363,475, filed on Apr. 22, 2022, the disclosures of which are hereby incorporated in their entireties herein by reference.

BACKGROUND

Field of the Invention

The present disclosure relates to connectors for attaching supply lines or instrumentation lines to vacuum tanks in ultra-high vacuum systems.

Description of the Related Art

High vacuum systems are used in many scientific and manufacturing applications, including particle accelerators and semiconductor device fabrication. In some semiconductor device fabrication processes, for example, caustic chemicals are selectively deposited onto a wafer at low pressures, and at temperatures typically in the range of 600° C. to 1000° C. In some processes, the deposition temperatures may exceed 1200° C. Thus, high vacuum systems must operate under severe chemical, pressure, and temperature conditions.

Conventional high vacuum systems have a hard metal vacuum tank with a plurality of hard metal tubes extending from the tank. A hard metal flange, which is generally made from the same metal as the vacuum tank, is welded to the end of each tube. Because the entire system, including all of the tubes and flanges, is generally made from the same material, the joints between the tubes and flanges are very secure and do not deteriorate under the chemical, pressure, and thermal cycling conditions under which high vacuum systems operate. Each flange is connected to another hard metal flange of the same metal on a chemical supply line or a vacuum line to sealingly connect the lines to the vacuum tank. The flanges are connected together by positioning a metal gasket between knife edges or other raised features on the hard metal flanges and then drawing the hard metal flanges together to engage the knife edges or raised features with the soft metal gasket. The hard-metal to hard-metal flange connection is a proven system that provides a secure, durable seal in standard vacuum environments.

Although conventional high vacuum systems with hard metal vacuum tanks perform adequately, newer high vacuum systems use soft metal vacuum tanks because they are generally lighter and less expensive to manufacture. The most common soft metal tanks are made from aluminum. One problem with soft metal tanks, however, is that it is difficult to connect the supply lines and vacuum lines to the tank because the joint between the soft metal tank and the hard metal flanges deteriorates under the severe pressure, temperature cycling, and chemical conditions used in semiconductor manufacturing and other ultra-high vacuum applications. For example, when the soft metal tank is composed of aluminum and the hard metal flanges are composed of stainless steel, the two metals tend to diffuse and react with each other when subjected to low pressure and either repeated temperature cycling or extended periods at high temperatures. This may create undesired alloys, compounds, metal byproducts, and intermetallics at the interface between the metals. After a period of time, therefore, ultra-high vacuum systems with soft metal tanks tend to leak at the joints between the soft metal and hard metal components.

One existing connector system used on soft metal high vacuum tanks has a knife edge flange composed of the same metal as that of the tank and a titanium-based film, such as a titanium oxide or titanium nitride film, coating the knife edge of the soft metal flange. The titanium oxide coating forms a thin hard metal layer over the soft metal flange knife edge that can dig into a soft metal gasket. However, one problem with this connector is that the titanium oxide layer often cracks, as most soft metals may anneal or even crack after repeated use at high temperatures used in typical high vacuum processes. Thus, soft metal flanges with a titanium oxide layer may leak after time in many high vacuum applications.

Ultra-high vacuum systems also create additional difficulties. Conventional high vacuum systems typically operate in the $10^{-6}$ to $10^{-8}$ torr range. However, it is desirable in some systems to operate at much lower pressures. Ultra-high vacuum systems, by contrast, may operate at $10^{-9}$ to $10^{-16}$ torr or lower.

U.S. Pat. No. 5,836,623 to Bothell, et al. discloses a connector system for use in ultra-high vacuum systems that includes a reaction-inhibiting barrier. The reaction-inhibiting barrier is preferably formed using explosive welding techniques. Explosive welding, also known as explosive bonding or explosion cladding, is a solid-state welding process that uses controlled, explosive energy to force two or more metals together at high pressures.

Explosive welding is traditionally used to bond a variety of metals together into a single assembly. Explosive welding involves the use of energy displaced from the discharge of explosive materials placed adjacent to a stack of multiple sheets of metal. The force imparted by the explosion creates a momentary pressure sufficient to displace a flyer plate onto a metal base plate at extremely high velocity, which forms a bond. During this process, a compressive wave front exists at the surface of the colliding plates which form a highly energetic plasma at the interface between the plates. This plasma etches the surfaces of the colliding metals, stripping them of contamination and oxides. The clean surfaces are then compressed together by the force of the explosive(s), facilitating the formation of metallurgical bonds.

Explosive welding processes require a secure, open area and the use of explosive ordinance. Methods of replicating the results of the explosive welding process in a controlled and potentially automated environment will offer significant advantages if reliable bond formation can be achieved. The contact pressures required to be achieved at the surface interface between metal sheets to be bonded are very high and require a manufacturing process which can achieve these high pressures.

In explosive welding processes, high temperatures are momentarily generated at the collision point between the two metals. In addition, plastic deformation of the surfaces occurs. This limits the types of metals that may joined, because the high energy frequently causes brittle intermetallics to form. For this reason, a third metal that does not form brittle phases with either of the other metals is introduced. This additional metal layer is typically referred to as an interlayer. Although necessary to form many joints when using explosive bonding, the use of interlayers complicates manufacturing and introduces an additional point of failure.

There remains a need for a connector system for use in ultra-high vacuum systems that includes a reaction-inhibiting barrier formed using bonding techniques that do not require the generation of extremely high forces or thick interlayers.

SUMMARY

A connector for use in an ultra-high vacuum system is disclosed herein. The connector has a metal conduit section with a first hardness, a metal fitting with a second hardness greater than the first hardness of the conduit section, and a metallic reaction-inhibiting barrier positioned between the conduit section and the fitting to sealingly attach the fitting to the conduit section. The metal conduit section has a first end, a second end, and a flow path between the first and second ends. The metal fitting has a rear face proximate to the second end of the conduit section, and an opening between the front and rear faces aligned with the flow path of the conduit section. The reaction-inhibiting barrier is selected from a group of metals and/or alloys that will substantially inhibit metallic and chemical interaction between the conduit section and the fitting under ultra-high vacuum, temperature cycling, mechanical stress, and reactive chemical conditions.

Novel methods are disclosed herein for replacing aluminum oxide on the surface of an aluminum sheet with an alternative layer or alternatively removing or displacing the aluminum oxide and preventing re-oxidization for a sufficient time to allow bonding to occur. This allows for the use of bonding methods that can be performed at lower energy levels than generated in explosive welding processes, such as lower maximum temperatures and/or less plastic deformation of the bonded surfaces during bonding. This enables less complex reaction-inhibiting barriers to be used, such as chrome and titanium. The reaction-inhibiting barrier accordingly substantially prevents deterioration of the joint between the metal conduit section and the metal fitting to reduce leaks under ultra-high vacuum conditions and improve mechanical robustness.

Each of the foregoing and various aspects, together with those set forth below and summarized above or otherwise disclosed herein, including the figures, may be combined without limitation to form claims for a device, apparatus, system, method of manufacture, and/or method of use.

DETAILED DESCRIPTION

Figure 1:
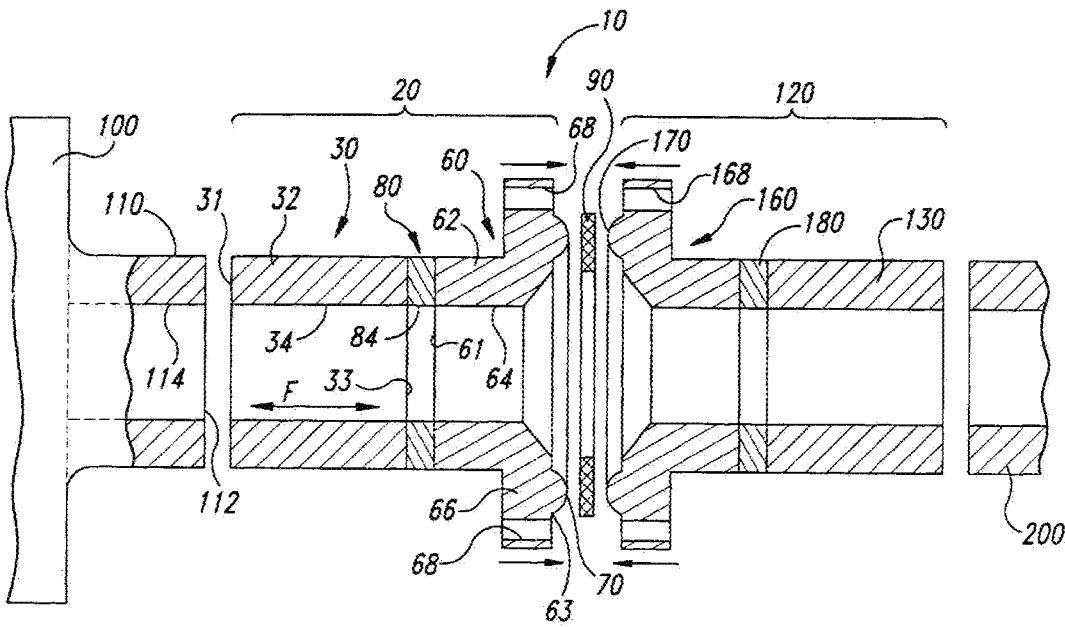
FIG. 1 shows a partial cross-sectional view of an embodiment of the disclosed connector and connector system.

A connector and connector system for use in an ultra-high vacuum system is disclosed herein. The connector is used to connect a soft metal component to another metal component with a hard-metal to hard-metal connection. A soft metal conduit section is preferably bonded to a hard metal fitting with a reaction-inhibiting barrier that is selected from a group of metals and/or alloys that substantially prevents metallic interaction between the soft metal conduit section and the hard metal fitting. The reaction-inhibiting barrier accordingly maintains the chemical integrity of the soft metal conduit section and the hard metal fitting by substantially preventing diffusion, breakdown, or the formation of intermetallics at the interface between the different types of metals. The soft metal conduit section is preferably attached to a component made from the same material, and the hard metal fitting is preferably a hard metal flange adapted to be releasably connected to another hard metal flange. As a result, the disclosed connector provides a hard-metal to hard-metal connection, and it prevents leaks at the joint between the soft metal conduit section and the hard metal fitting.

The connector has a metal conduit section with a first hardness, a metal fitting with a second hardness greater than the first hardness of the conduit section, and a metallic reaction-inhibiting barrier positioned between the conduit section and the fitting to sealingly attach the fitting to the conduit section. As used herein, the conduit section is described as sealingly attached to the fitting when the reaction-inhibiting barrier positioned between the conduit section and fitting is sealingly bonded to the fitting and is also sealingly bonded to the conduit section. The metal conduit section has a first end, a second end, and a flow path between the first and second ends. The metal fitting has a rear face proximate to the second end of the conduit section, and an opening between the front and rear faces aligned with the flow path of the conduit section. The reaction-inhibiting barrier is selected from a group of metals and/or alloys that will substantially inhibit metallic and chemical interaction between the conduit section and the fitting under ultra-high vacuum, temperature cycling, mechanical stress, and reactive chemical conditions. The reaction-inhibiting barrier is metallurgically bonded using bonding techniques that do not necessarily require extremely energetic conditions, such as high temperatures or significant plastic deformation. Immediately prior to bonding, a surface oxide is removed or displaced from the surface of the metal that ultimately forms the conduit section. This enables the faying surfaces to have metallurgical contact. The reaction-inhibiting barrier accordingly substantially prevents deterioration of the joint between the metal conduit section and the metal fitting to reduce leaks under ultra-high vacuum conditions.

An ultra-high vacuum system may operate in the range of $10^{-8}$ to $10^{-16}$ torr or lower. Depending on the environment, ultra-high vacuum systems may undergo repeated low temperature cycling from room temperature down to 2° K, repeated high temperature cycling from room temperature up to 775° K, and repeated large range temperature cycling from 2° K to 775° K. Such temperature cycling at such low pressures causes the joints between components composed of aluminum and stainless steel to deteriorate and leak after a short time. Connector systems composed of two metals with different thermal properties under high vacuum will undergo reactions that may result in the formation of various metallic compounds, alloys, or other materials which allow the joint to leak. By using the disclosed connector and connector system, these problems are ameliorated.

FIGS. 1-6 illustrate embodiments of the disclosed connectors and connector systems. Like reference numbers refer to like parts throughout the figures.

FIG. 1 illustrates an embodiment of a connector system 10 for releasably connecting a soft metal vacuum tank 100 to a fluid line 200. The connector system 10 has a first connector 20 adapted to be attached to the tank 100, and a second connector 120 adapted to be attached to the fluid line 200. The first and second connectors 20 and 120 preferably have the same general structure, but, as explained in detail below, the component parts of the connectors 20 and 120 may be made from different materials to accommodate the specific materials from which the tank 100 and fluid tube 200 are made.

The first connector 20 has a soft metal conduit section 30 with a tubular wall 32 that extends along a fluid flow path F between a first end 31 and a second end 33. The tubular wall 32 defines an elongated opening 34 through the conduit section along the flow path F. The first end 31 of the metal conduit section 30 is connected to a port 112 of a tube 110 on the vacuum tank 100. The tube 110 has an elongated opening 114 that extends into an internal cavity within the vacuum tank 100 and is aligned with the elongated opening 34 through the conduit section 30. The conduit section 30 is preferably connected to the port 112 by welding or braising the first end 31 of the conduit section 30 to the tube 110.

The conduit section 30 and the tube 110 are made of compatible metals that maintain a good seal at the joint between the conduit section 30 and the tube 110 under ultra-high vacuum and temperature cycling conditions. Accordingly, the conduit section 30 and the tube 110 are generally made from the same metal. If the tank 100 is aluminum or an aluminum alloy, suitable metals for the conduit section 30 include, but are not limited to, aluminum, titanium, zirconium, yttrium, molybdenum, manganese, copper, and alloys thereof. In some preferred embodiments, the conduit section 30 is made from aluminum.

Figure 4:
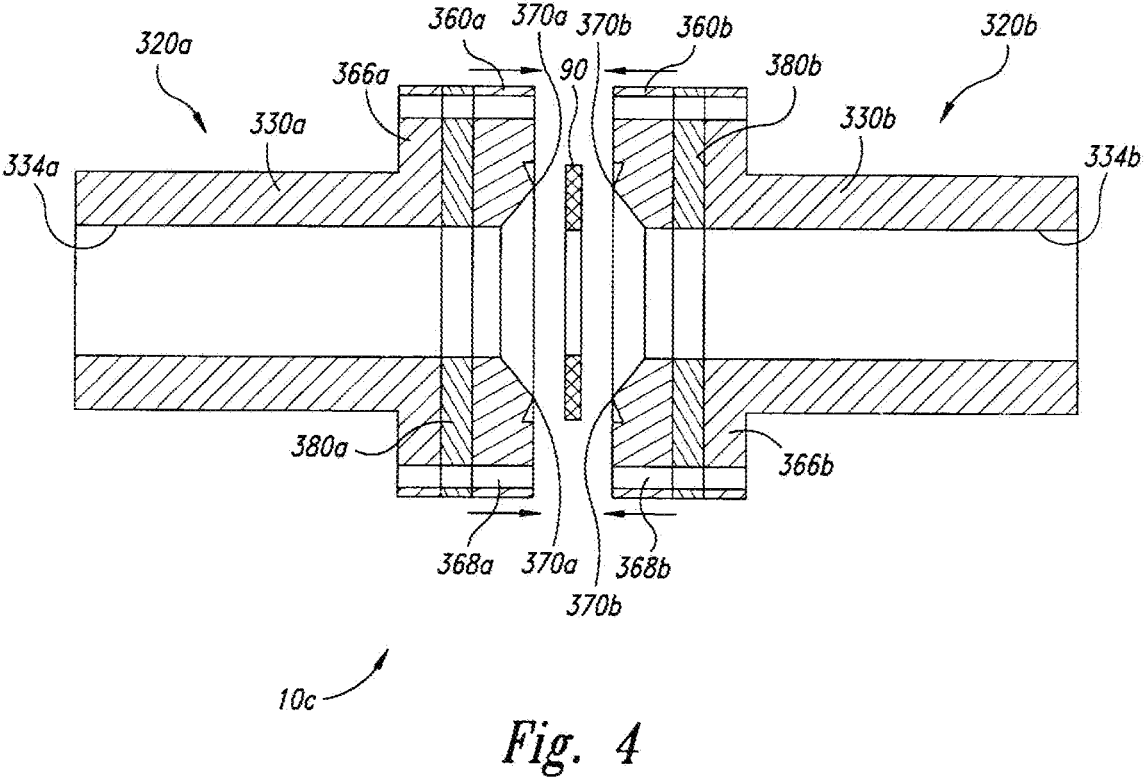
FIG. 4 shows a partial cross-sectional view of another embodiment of the disclosed connector system.

The first connector 20 also has a metal fitting 60 with a second hardness greater than that of the first hardness of the conduit section 30. The metal fitting 60 has a tubular wall 62 with a rear face 61 positioned proximate to the second end 33 of the conduit section 30, and a flange 66 with a front face 63 facing towards the line 200. The tubular wall 62 defines an opening 64 aligned with the elongated opening 34 of the conduit section 30. The flange 66 extends outwardly from the tubular wall 62, and a plurality of bolt holes 68 pass through the flange 66. The flange 66 also has a raised feature 70 on its front face 63 that extends towards the second connector 120. The raised feature may be rounded (as shown) or may be a sharp knife edge (as shown in FIG. 4). Suitable metals from which the metal fitting 60 may be made include, but are not limited to, stainless steel, titanium, vanadium, nickel, cobalt, iron, chromium, zirconium, yttrium, and alloys thereof. In some preferred embodiments, the metal fitting 60 is made from a hard metal such as stainless steel.

Still referring to FIG. 1, a metallic reaction-inhibiting barrier 80 is positioned between the second end 33 of the conduit section 30 and the rear face 61 of the fitting 60. The reaction-inhibiting barrier 80 sealingly attaches the conduit section 30 to the fitting 60 to substantially prevent the joint between the conduit section 30 and the fitting 60 from deteriorating under severe pressure, temperature cycling, and chemical conditions. The reaction-inhibiting barrier 80 preferably has an aperture 84 aligned with both the elongated opening 34 of the conduit section 30 and the opening 64 of the fitting 60 to allow the flow path F to extend throughout the length of the connector 20.

The reaction-inhibiting barrier 80 is selected from a group of metals and/or alloys that substantially prevents metallic or chemical interaction between the soft metal conduit section 30 and the hard metal fitting 60. The reaction-inhibiting barrier may, for example, be titanium, chrome, niobium, or tantalum. Alternately, the reaction-inhibiting barrier may, for example, be composed of two layers, such as a titanium layer and a copper layer or a titanium layer and a nickel layer. The reaction-inhibiting barrier 80 may be made from a single metal, or alternatively from multiple metals that are bonded together into a layered metal stack. The reaction-inhibiting barrier 80 accordingly reduces the deterioration at the interface between the soft metal conduit 30 and the hard metal fitting 60 that typically occurs with semiconductor processing chemicals under ultra-high vacuum conditions and extreme temperatures. Therefore, the connector 20 does not leak at the bond between the soft metal conduit section 30 and the metal fitting 60.

In some embodiments, the metal conduit section 30 is made of aluminum, the metal fitting 60 is made of stainless steel, and the reaction-inhibiting barrier 80 has a layer of titanium or a layer of chromium (i.e., a chrome layer) that is bonded to an aluminum oxide inhibitor layer. The titanium or chrome layer is bonded to the stainless steel fitting 60 and the aluminum oxide inhibitor is applied at the faying surface of the aluminum conduit section 30. The aluminum oxide layer on the surface of the conduit section is first displaced or removed, and reoxidation of the aluminum is then prevented for a time sufficient to allow bonding of the aluminum oxide inhibitor to the aluminum of the conduit section 30. The aluminum oxide inhibitor subsequently inhibits the formation of a new layer of aluminum oxide on the faying surface of the aluminum conduit section 30. The titanium or chrome and aluminum oxide inhibitor layers substantially prevent metallic or chemical interaction between the aluminum conduit section 30 and the fitting 60 to maintain the integrity of the joint between the conduit section 30 and the fitting 60 under ultra-high vacuum and temperature cycling conditions.

In some embodiments, the metal conduit section 30 is made of aluminum, the metal fitting 60 is made of stainless steel, and the reaction-inhibiting barrier 80 has a layer of titanium bonded to a layer of an aluminum oxide inhibitor. The titanium layer is bonded to the stainless steel fitting 60 and the aluminum oxide inhibitor is bonded to the aluminum conduit section 30. The aluminum oxide layer on the surface of the conduit section is first displaced or removed, and reoxidation of the aluminum is then prevented for a time sufficient to allow bonding of the aluminum oxide inhibitor to the aluminum of the conduit section 30. The aluminum oxide inhibitor subsequently inhibits the formation of a new layer of aluminum oxide on the surface of the conduit section 30. The titanium and aluminum oxide inhibitor layers substantially prevent disadvantageous metallurgic interaction between the aluminum conduit section 30 and the fitting 60 to maintain the integrity of the joint between the conduit section 30 and the fitting 60 under ultra-high vacuum and temperature cycling conditions.

The aluminum oxide inhibitor may preferably be selected from the group consisting of silver, copper, zinc, gold, titanium, and chromium.

In some alternate embodiments, the metal conduit section 30 is made of aluminum, the metal fitting 60 is made of stainless steel, and the reaction-inhibiting barrier 80 has a layer of chromium (i.e., a chrome layer) bonded to a layer of an aluminum oxide inhibitor. The chrome layer is bonded to the stainless steel fitting 60 and the aluminum oxide inhibitor is applied to the aluminum conduit section 30. The aluminum oxide layer on the surface of the conduit section is first displaced or removed, and reoxidation of the aluminum is then prevented for a time sufficient to allow bonding to the chrome layer 80. The chrome layer substantially prevents metallic or chemical interaction between the aluminum conduit section 30 and the fitting 60 to maintain the integrity of the joint between the conduit section 30 and the fitting 60 under ultra-high vacuum and temperature cycling conditions.

In some alternate embodiments, the metal conduit section 30 is made of aluminum, the metal fitting 60 is made of stainless steel, and the reaction-inhibiting barrier 80 is a single layer of titanium or a single layer of chromium (i.e., a chrome layer). The titanium or chrome layer is bonded to both the stainless steel fitting 60 and aluminum conduit section 30. The aluminum oxide layer on the surface of the conduit section is first displaced or removed using a mechanical aluminum oxide disruptor, and reoxidation of the aluminum is then prevented for a time sufficient to allow bonding of the titanium or chrome layer to the aluminum of the conduit section 30. The titanium or chrome layer substantially prevents metallic or chemical interaction between the aluminum conduit section 30 and the fitting 60 to maintain the integrity of the joint between the conduit section 30 and the fitting 60 under ultra-high vacuum and temperature cycling conditions.

The mechanical aluminum oxide disruptor may preferably be selected from the group consisting of zinc, indium, gallium, lead, bismuth, and mercury. The aluminum oxide disruptor is applied as a molten metal in a very small quantity and penetrates below the aluminum oxide following its application. The aluminum oxide disruptor displaces the aluminum oxide and enables direct contact of the reaction-inhibiting barrier with aluminum. The aluminum oxide disruptor then dissolves into the bulk aluminum and the reaction-inhibiting barrier 80.

In some alternate embodiments, the metal conduit section 30 is made of aluminum, the metal fitting 60 is made of stainless steel, and the reaction-inhibiting barrier 80 is a single layer of titanium or a single layer of chromium (i.e., a chrome layer). The titanium or chrome layer is bonded to both the stainless steel fitting 60 and aluminum conduit section 30. The aluminum oxide layer on the surface of the conduit section is first displaced or removed using a mechanical process that causes physical disruption of the aluminum oxide, and reoxidation of the aluminum is then prevented for a time sufficient to allow bonding of the titanium or chrome layer to the aluminum of the conduit section 30. The titanium or chrome layer substantially prevents metallic or chemical interaction between the aluminum conduit section 30 and the fitting 60 to maintain the integrity of the joint between the conduit section 30 and the fitting 60 under ultra-high vacuum and temperature cycling conditions.

In the connector system 10 shown in FIG. 1, the first connector 20 is releasably coupled to the second connector 120. The second connector 120 has a conduit section 130 adapted to be connected to the fluid line 200, a hard metal fitting 160 juxtaposed to the metal fitting 60 of the first connector 20, and a reaction-inhibiting barrier 180 sealingly connecting the conduit section 130 to the fitting 160. The conduct section 130 is preferably made from the same metal as that of the fluid line 200 so that the conduit section 130 may be welded or brazed to the fluid line 200 to form a durable joint between the conduit section 130 and the fluid line 200. The fitting 160 is preferably made from a hard metal, and preferably has a raised feature 170. In some embodiments, the raised feature 170 mirrors the raised feature 70 of the fitting 60. In some other embodiments, the raised feature 170 is complementary to and mates with the raised feature 70 of the fitting 60. Thus, depending upon the materials from which the vacuum tank 100 and the fluid line 200 are made, the first and second connectors 20 and 120 may be made from the same materials.

The first and second connectors 20 and 120 are releasably attachable to one another so that the tank 100 may be disconnected from the line 200. To attach the connectors 20 and 120 together, the metal fittings 60 and 160 are drawn together by a number of bolts (not shown) positioned in the bolt holes 68 and 168. As the fittings 60 and 160 are drawn together, the raised features 70 and 170 engage a soft metal gasket 90 between the fittings 60 and 160 to create a sealed connection between the first and second connectors 20 and 120. The seal against the soft metal gasket 90 prevents leaks at the interface between the first and second connectors 20 and 120 under severe chemical, pressure, and temperature cycling conditions. To release the first connector 20 from the second connector 120, the bolts are merely disengaged from the connectors.

One advantage of the disclosed connector system is that the connector does not leak at the joint between the soft metal conduit section 30 and the hard metal fitting 60. By providing a reaction-inhibiting barrier that substantially prevents metallic or chemical interaction between the conduit section 30 and the fitting 60, the joint between the conduit section 30 and the fitting 60 does not deteriorate under the chemical, ultra-high vacuum, and temperature cycling conditions typically associated with semiconductor manufacturing and other ultra-high vacuum applications. The disclosed connector system thus provides a durable, highly-effective transition connector between different metals that is releasably attachable to another connector.

Another advantage of the disclosed connector system is that it provides a hard-metal to hard-metal connection between a soft metal component and a component made from another metal. Unlike many prior art connectors used with soft metal components, the disclosed connector system uses a hard metal fitting that can withstand large temperature extremes without cracking. Therefore, the first and second connectors 20 and 120 provide the desirable hard-metal to hard-metal connections necessary for releasable connectors in ultra-high vacuum and temperature cycling conditions.

Figure 2A:
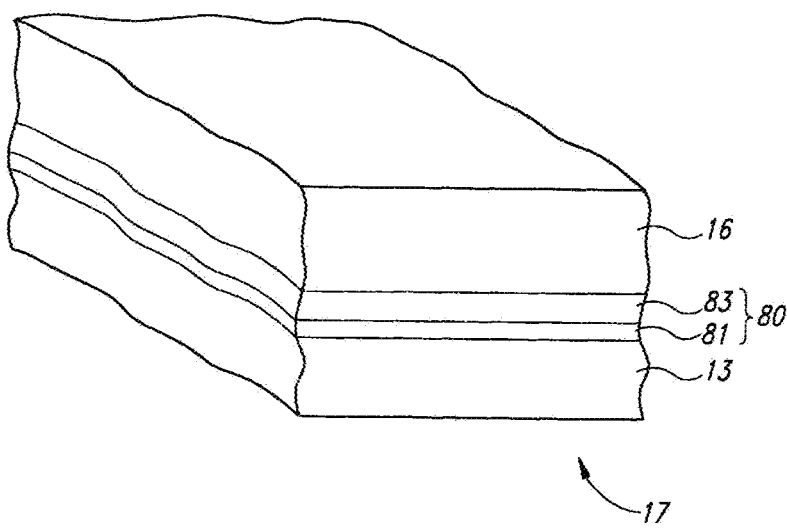
FIG. 2A shows a partial isometric view of an embodiment of a bonded metal stack from which an embodiment of the disclosed connector may be fabricated.
Figure 2B:
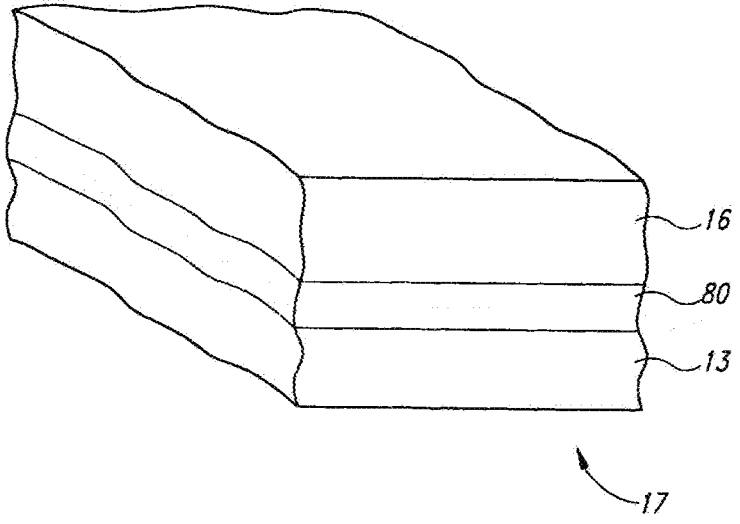
FIG. 2B shows a partial isometric view of another embodiment of a bonded metal stack from which an embodiment of the disclosed connector may be fabricated.

As depicted in FIGS. 2A-2B, the connectors 20 and 120 are preferably manufactured by forming a metal stack 17, and then machining the connectors from the metal stack 17. A first metal layer 13 composed of a first metal is bonded to one side of the reaction-inhibiting barrier 80. A second metal layer 16 composed of a second metal is then bonded to the other side of the reaction-inhibiting barrier 80. The bonding of the metal layers may preferably be performed using bonding techniques known in the art that may be performed without the maximum temperature exceeding about 575° C. at any point during the bonding process, such as diffusion bonding or roll bonding. More preferably, the bonding of the metal layers may be performed using bonding techniques known in the art that may be performed without the maximum temperature exceeding about 550° C. at any point during the bonding process. Even more preferably, the bonding of the metal layers may be performed using bonding techniques known in the art that may be performed without the maximum temperature exceeding about 475° C. at any point during the bonding process. After the metal stack 17 is formed, the conduit section 30 is machined from the first metal layer 13, and the fitting 60 is machined from the second metal layer 16.

In some embodiments, the first metal layer 13 is coated with a first layer 81 of an oxide inhibitor and the second metal layer 16 is coated with a second layer 83 of reaction-inhibiting barrier 80, as shown in FIG. 2A. In other embodiments, the reaction-inhibiting barrier 80 is composed of a single layer, as shown in FIG. 2B. The single layer of the reaction-inhibiting barrier 80 may preferably be coated on either the first metal layer 13 or the second metal layer 16 prior to formation of the metal stack 17.

Suitable techniques for coating the reaction-inhibiting barrier onto the first or second metal layers include vacuum deposition techniques such as PVD and CVD, metal spray techniques such as flame, plasma, and cold spray techniques, explosive or roll bonding, or electroplating.

Thus, for example, titanium or chromium may be plated onto stainless steel using a vacuum deposition technique such as PVD or CVD, a metal spray technique such as a flame, plasma, or cold spray, explosive or roll bonding, or electroplating to yield a titanium or chrome plated stainless steel plate.

Aluminum oxide is removed or displaced from the conduit section 30 and reoxidization is prevented for a time sufficient to allow bonding between the reaction-inhibiting barrier 80 and the aluminum of the conduit section 30 to occur. This allows for bonding techniques that may be performed without the maximum temperature exceeding about 575° C. at any point during the bonding process and that do not require localized temperatures in excess of about 575° C. for even a short duration. Although the precise mechanism of explosive welding processes is not well understood, it is presumed that a highly energetic state is achieved for a short duration during explosive welding. This highly energetic state may be an extremely high maximum surface temperature and/or plastic deformation of the bonded surfaces. Despite the extremely short duration of extremely high temperature and/or plastic deformation during explosive welding, this is nonetheless sufficient to render the use of various potential reaction-inhibiting barriers incompatible with an explosive welding process. The high temperatures provide the necessary energy to form brittle intermetallics that are not formed at lower temperatures. By maintaining a comparatively lower temperature throughout the bonding process, a wider variety of reaction-inhibiting barriers, including reaction-inhibiting barriers composed of a thin layer of chromium or titanium, may be used.

An aluminum oxide layer may be mechanically removed from the surface of an aluminum plate that will form the conduit section prior to bonding thereto of a stainless steel plate coated with a reaction-inhibiting barrier. Alternatively, an aluminum oxide layer on the surface of an aluminum plate that will form the conduit section may be reduced to aluminum metal prior to bonding a stainless steel plate coated with a reaction-inhibiting barrier thereto.

As used herein, the term "mechanically" refers to any physically disruptive process, whether the mechanical disruption occurs via application of a mechanical stressor such as stretching, pulling, or otherwise applying a mechanical force, or via treatment with a metal, alloy, or other material that causes a layer to be physically separated or displaced from another layer. Thus, a mechanical oxide disruptor may be a metal that causes an oxide layer to be physically separated from an underlying layer. For example, a mechanical oxide disruptor may cause an aluminum oxide layer to be physically separated from an underlying aluminum layer; such physical separation caused by application of a mechanical oxide disruptor is within the scope of the terms "mechanical" and "mechanically" as used herein.

Thus, as used herein, mechanical disruption of an aluminum oxide layer may refer to physical disruption via application of a mechanical stressor such as by stretching of the aluminum plate or may refer to disruption caused by treatment with a mechanical oxide disruptor such as zinc, indium, gallium, lead, bismuth, or mercury that causes physical separation of the aluminum oxide layer from the underlying aluminum layer.

As used herein, the term "stretching" includes mechanically disruptive processes caused by various mechanical stressors. For example, stretching of a first metal plate may occur by pulling on both ends of the first metal plate, rolling or pressing a second metal plate against the first metal plate to cause outward linear displacement at the surface of the first metal plate, or via another form of mechanical stress applied to the first metal plate. As used herein, the term "stretching" does not include stretching that is incident to explosive welding or other explosive processes.

In some embodiments, aluminum oxide is plasma etched off the surface of an aluminum plate under vacuum. An oxide inhibitor is then vacuum deposited onto the aluminum while under high vacuum so that there is little oxygen available to interfere with bonding. Bonding occurs by pressing or rolling a stainless steel plate coated with a titanium or chrome layer against the aluminum plate. Bonding may occur at temperatures preferably below about 575° C., more preferably below about 550° C., and even more preferably below about 475° C.

In some alternate embodiments, aluminum oxide is plasma etched off the surface of an aluminum plate under vacuum, and then a stainless steel plate coated with a titanium or chrome layer is immediately bonded to the aluminum plate by pressing or rolling the coated stainless steel plate against the aluminum plate. Bonding may occur at temperatures preferably below about 575° C., more preferably below about 550° C., and even more preferably below about 475° C.

In some other alternate embodiments, an oxide inhibitor metal such as silver, copper, or zinc is electroplated onto the surface of an aluminum plate. Aluminum oxide is chemically removed from the surface of the aluminum plate and is replaced by the oxide inhibitor metal. Bonding occurs by pressing or rolling a stainless steel plate coated with a titanium or chrome layer against the aluminum plate. Bonding may occur at temperatures preferably below about 575° C., more preferably below about 550° C., and even more preferably below about 475° C.

In some other alternate embodiments, aluminum oxide on the surface of an aluminum plate is mechanically disrupted with a mechanical oxide disruptor, which may be a molten metal such as zinc, indium, gallium, lead, bismuth, or mercury. The molten metal displaces or dissolves the aluminum oxide while migrating or penetrating below the oxide so as to prevent or otherwise inhibit the aluminum oxide layer from reforming. The precise mechanism by which the aluminum oxide dissipates is not fully understood. However, it is observed that after treatment with the mechanical oxide disruptor, elemental aluminum of the aluminum plate is exposed to the reaction-inhibiting barrier and may be bonded thereto. Bonding occurs by pressing or rolling a stainless steel plate coated with a titanium or chrome layer against the aluminum plate. Bonding may occur at temperatures preferably below about 575° C., more preferably below about 550° C., and even more preferably below about 475° C. While it is not entirely clear whether the aluminum oxide dissolves into the aluminum layer, diffuses thereinto, or dissipates by another mechanism, it is observed that following bonding of the reaction-inhibiting barrier coating on the stainless steel plate with the exposed aluminum of the aluminum plate, aluminum oxide is no longer present as a barrier layer between the aluminum and the reaction-inhibiting barrier.

In yet other alternate embodiments, aluminum oxide on the surface of an aluminum plate is mechanically disrupted by stretching the aluminum plate while the aluminum plate is in contact with a stainless steel plate coated with a titanium or chrome layer. The titanium or chrome layer on the surface of the stainless steel plate is in metallurgical contact with the aluminum for a period of time sufficient to form metallic bonds. The metallurgical contact between the titanium or chrome layer and the aluminum plate provides a low oxygen environment such that the aluminum oxide layer is not able to re-form. Bonding occurs by pressing or rolling a stainless steel plate coated with a titanium or chrome layer against the aluminum plate. Bonding may occur at temperatures preferably below about 575° C., more preferably below about 550° C., and even more preferably below about 475° C.

Because the bonding process occurs at a comparatively lower energy state than explosive welding, where this lower energy state may include a relatively lower temperature and/or less plastic deformation of the surface to which the reaction-inhibiting barrier is being bonded, it is possible to use a relatively thin reaction-inhibiting barrier. This therefore allows the reaction-inhibiting barrier to be deposited onto the stainless steel plate via CVD, PVD, or electroplating. Coating techniques such as CVD, PVD, and electroplating are more industrially viable in many applications, but these techniques have practical limitations for the thickness of coatings applied therewith. Use of these techniques is thus viable if explosive welding of the reaction-inhibiting barrier to the aluminum plate is avoided.

Previously known bimetallic bonding techniques employ explosive welding techniques for bonding. Although explosive welding is well suited for removing the aluminum oxide layer off aluminum, it produces a high energy state at the bonding site, which may include a very high temperature for a short duration and/or plastic deformation at the bonding site. This very high temperature may cause the metals at the bonding site to interact with sufficient energy to form intermetallics. This is problematic in stainless steel-aluminum joints, as the intermetallics are often brittle or occupy less volume than the parent metals, which leads to porosity and leakage. This is unsuitable for ultra-high vacuum flanges and fittings, which must not leak or have micro-porosity. For this reason, it is critical to use a reaction-inhibiting barrier to prevent brittle intermetallics from forming between the aluminum and the stainless steel. The aluminum oxide removal techniques disclosed herein enable the use of bonding methods that do not require high momentary energy levels, such as high momentary heat loads and/or significant momentary plastic deformation.

Figure 3:
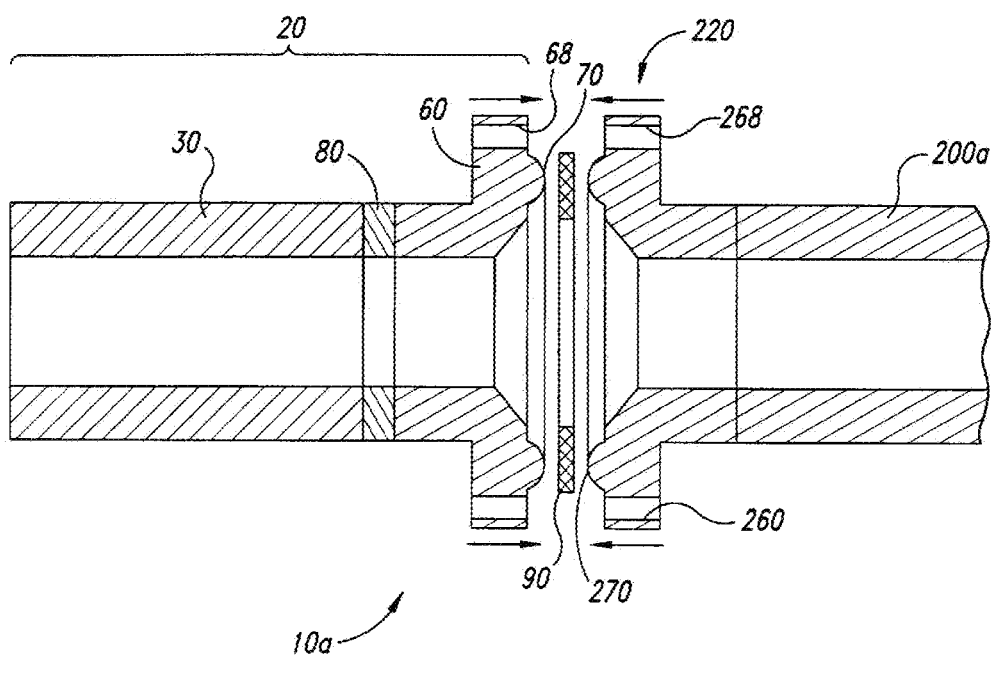
FIG. 3 shows a partial cross-sectional view of another embodiment of the disclosed connector system.

FIG. 3 illustrates another embodiment of the disclosed connector system 10(a) in which the connector 20 is coupled to a hard metal connector 220 that is itself welded directly to a hard metal supply line 200(a). The connector 220 has a flange 260 with a raised feature 270 and a plurality of bolt holes 268. A plurality of bolts (not shown) in the bolt holes 68 and 268 draw the metal fittings 60 and 260 into engagement with a soft metal gasket 90, until the raised features 70 and 270 of the metal fittings 60 and 260 seal against the soft metal gasket 90. Therefore, the disclosed connector system also provides a hard-metal to hard-metal connection when only one component of the ultra-high vacuum system is made from a soft metal.

FIG. 4 illustrates yet another embodiment of the disclosed connector system 10(c) in which a hard metal knife edge connector 320(a) is connected to another hard metal knife edge connector 320(b). The first connector 320(a) has a conduit section 330(a), a fitting 360(a) positioned proximate to the conduit section 330(a), and a reaction-inhibiting barrier 380(a) positioned between the conduit section 330(a) and the fitting 360(a). The reaction-inhibiting barrier 380(a) sealingly attaches the conduit section 330(a) to the fitting 360(a) to substantially prevent the joint between the conduit section 330(a) and the fitting 360(a) from deteriorating under the severe pressure, temperature cycling, and chemical conditions discussed above. The connector 320(a) has a flange 366(a) formed from a portion of the conduit 330(a), the reaction-inhibiting barrier 380(a), and the fitting 360(a). A plurality of bolt holes 368(a) extend through the flange 366(a), and a raised feature that defines a knife edge 370(a) extends from a depression around an elongated opening 334(a) through the connector 320(a). The conduit section 330(a), the fitting 360(a), and the reaction-inhibiting barrier 380(a) may be composed of the same materials as discussed above with respect to the connectors 20 and 120 of FIGS. 1-3. The components of the second connector 320(b) may be substantially similar to the components of the first connector 320(a) discussed above.

In alternate embodiments, flanges may be made without conduit section 330(a), without conduit section 330(b), or without both.

In operation, a plurality of bolts (not shown) in the bolt holes 368(a) and 368(b) draw the metal fittings 360(a) and 360(b) into engagement with a soft metal gasket 90, until the knife edges 370(a) and 370(b) of the metal fittings 360(a) and 360(b) seal against the soft metal gasket 90. In view of the position of the reaction-inhibiting barriers 380(a) and 380(b) shown in FIG. 4, it will be appreciated that the disclosed connector system may position the reaction-inhibiting barrier and the connector at any convenient location along the connector to provide an adequate cost effective seal between the conduit section and the hard metal fitting.

Figure 5:
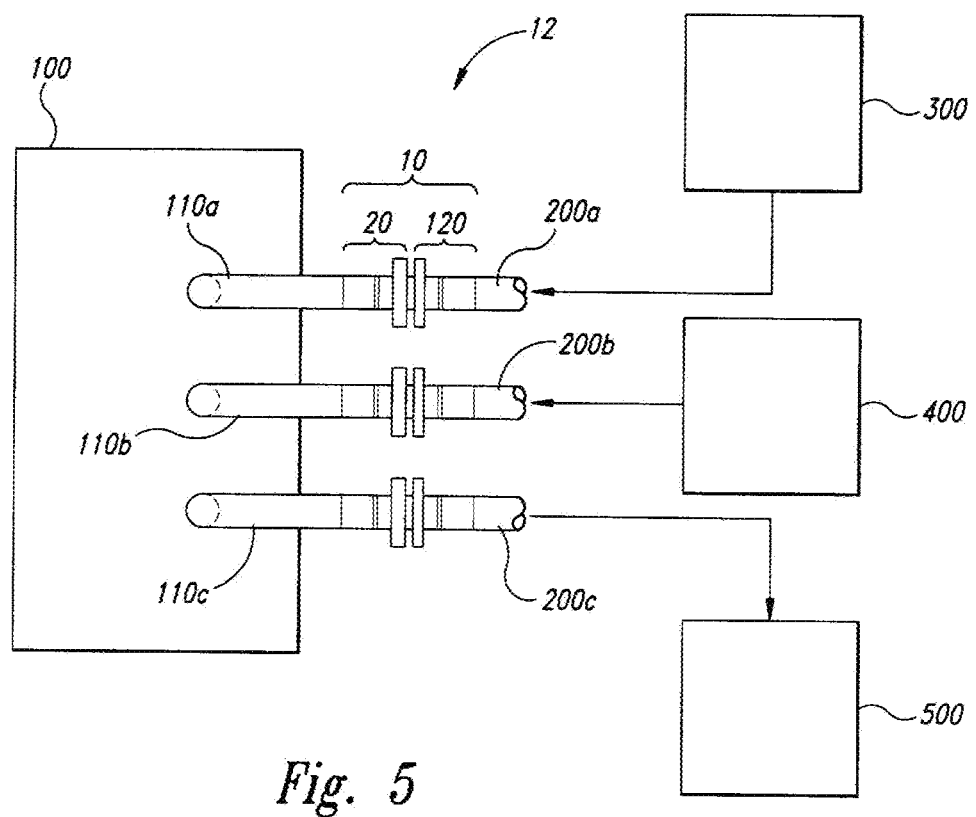
FIG. 5 shows a schematic view of an ultra-high vacuum system that includes an embodiment of the disclosed connector system.

FIG. 5 schematically illustrates an embodiment of an ultra-high vacuum system 12 that uses the disclosed connector system. The ultra-high vacuum system 12 has a vacuum tank 100 with a number of tubes 110(a)-(c). A connector system 10 with first and second connectors 20 and 120 attaches each of the tubes 110(a)-(c) to supply lines 200(a)-(c), respectively. A first chemical supply 300 is connected to the supply line 200(a), a second chemical supply 400 is connected to the supply line 200(b), and a vacuum pump 500 is connected to the supply line 200(c).

In operation, the vacuum pump 500 draws down the pressure within the vacuum tank 100 to a desired level, which may be approximately $10^{-8}$ to $10^{-16}$ torr or lower. The vacuum system 12 is also heated or cooled to a desired temperature between 2° K and 1400° K, and the temperatures may be repeatedly cycled several times between a first high temperature and a second low temperature. The appropriate chemicals from the first and second chemical supplies 300 and 400 are then selectively delivered into the vacuum tank 100 through the supply lines 200(a) and 200(b). As discussed above with respect to FIG. 1, the vacuum tank 100 is preferably a soft metal tank made from an aluminum or another suitable metal.

The vacuum system 12, and more specifically the connectors 120(a)-(c), maintain an ultra-high vacuum after at least twenty temperature cycles and more preferably after over 200 temperature cycles. The standard for determining whether a reaction-inhibiting barrier has maintained the integrity of the joint between the conduit section and the fitting is measured by the extent of leaking at the joint. Thus, a reaction-inhibiting barrier that substantially inhibits metallic interaction between the conduit section and the fitting may allow a measurable change in structure at the joint so long as the connector maintains an ultra-high vacuum after repeated temperature cycling.

Figure 6:
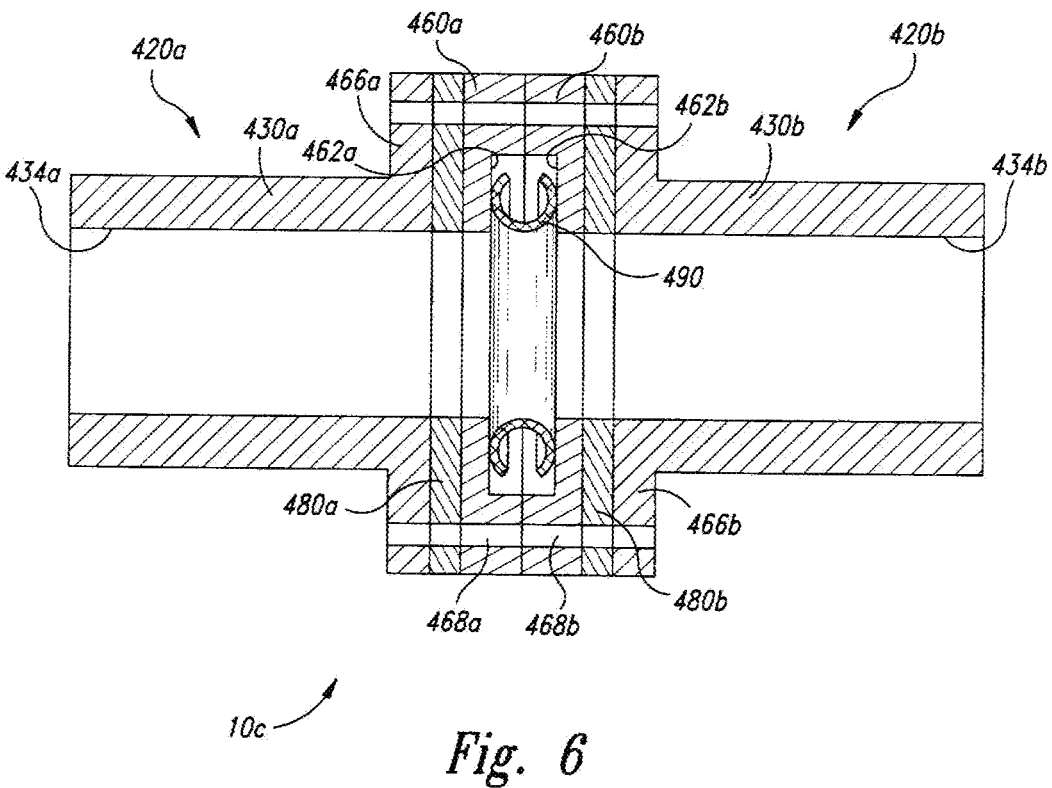
FIG. 6 shows a partial cross-sectional view of another embodiment of the disclosed connector system.

FIG. 6 illustrates yet another embodiment of the disclosed connector system in which a C-shaped spring seals a first connector 420(*a*) to a second connector 420(*b*). The first connector 420(*a*) has a conduit section 430(*a*), a fitting 460(*a*) positioned proximate to the conduit section 430(*a*), and a reaction-inhibiting barrier 480(*a*) positioned between the conduit section 430(*a*) and the fitting 460(*a*). The reaction-inhibiting barrier 480(*a*) sealingly attaches the conduit section 430(*a*) to the fitting 460(*a*) to substantially prevent the joint between the conduit section 430(*a*) and the fitting 460(*a*) from deteriorating under the severe pressure, temperature cycling, and chemical conditions discussed above. The first connector 420(*a*) has a flange 466(*a*) formed from a portion of the conduit section 430(*a*), the reaction-inhibiting barrier 480(*a*), and the fitting 460(*a*). A number of bolt holes 468(*a*) extend through the flange 466(*a*), and the front face of the fitting 460(*a*) has a large recess 462(*a*) in which a portion of a C-shaped spring seal is positioned. The conduit section 430(*a*), the fitting 460(*a*), and the reaction-inhibiting barrier 480(*a*) are generally composed of the same materials as discussed above with respect to the connectors 20, 120, and 320 of FIGS. 1-4. The components of the second connector 420(*b*) may be substantially similar to the components of the connector 420(*a*) discussed above.

In operation, a plurality of bolts (not shown) positioned in the bolt holes 468(*a*) and 468(*b*) may be used to draw the metal fittings 460(*a*) and 460(*b*) into engagement with the C-shaped spring 490. As the C-shaped spring 490 is compressed, the contact points between the C-shaped spring 490 and the recesses 462(*a*) and 462(*b*) create a seal between the first and second connectors 420(*a*) and 420(*b*).

Although the connectors and connector systems described herein are suitable for use in ultra-high vacuum (UHV) systems, it will be understood by skilled artisans that the disclosed connectors and connector systems may alternatively be used in non-UHV applications. Thus, the disclosed connectors and connector systems, and methods of making and using the same, may be used in low vacuum or high vacuum systems that are not exposed to one or more of the rigorous conditions to which UHV systems are frequently exposed and designed to withstand. Thus, while the disclosed connectors are suitable for use in UHV systems, they may also be used in vacuum systems that do not generate the extremely low pressures typically achieved by UHV systems.

NUMBERED EXAMPLES

EXAMPLE 1: A connector for use in an ultra-high vacuum system that includes: (a) a metal conduit section with a first hardness that has a first faying surface; (b) a metal fitting with a second hardness greater than the first hardness; and (c) a metallic reaction-inhibiting barrier positioned between the conduit section and the fitting; where the first faying surface of the conduit section is in physical contact with and bonded to the reaction-inhibiting barrier; where the conduit section is sealingly attached to the fitting;

where the reaction-inhibiting barrier substantially inhibits metallic and chemical interaction between the conduit section and the fitting under ultra-high vacuum, temperature cycling, mechanical stress, and reactive chemical conditions; and where an oxide layer on the first faying surface is removed prior to or during bonding of the reaction-inhibiting barrier to the first faying surface and oxide re-formation on the first faying surface is prevented either mechanically or via treatment with an oxide inhibitor; is described.

EXAMPLE 2: The connector of Example 1 where the metal conduit section is composed of aluminum, the metal fitting is composed of stainless steel, and the reaction-inhibiting barrier is selected from the group consisting of a titanium layer, a chrome layer, a niobium layer, a tantalum layer, a layer of titanium and a layer of copper, and a layer of titanium and a layer of nickel is described.

EXAMPLE 3: The connector of Example 2 where the reaction-inhibiting barrier is a titanium or chrome layer is described.

EXAMPLE 4: The connector of Example 2 where the reaction-inhibiting barrier is a titanium layer is described.

EXAMPLE 5: The connector of Example 2 where the reaction-inhibiting barrier is a chrome layer is described.

EXAMPLE 6: The connector of Example 1 where the first faying surface is treated with a mechanical oxide disruptor, thereby both mechanically removing the oxide layer on the first faying surface and preventing oxide re-formation on the first faying surface, is described.

EXAMPLE 7: The connector of Example 6 where the mechanical oxide disruptor is selected from the group consisting of zinc, indium, gallium, lead, bismuth, and mercury is described.

EXAMPLE 8: The connector of Example 1 where the first faying surface is contacted by the reaction-inhibiting barrier and then the conduit section is stretched while the first faying surface is in contact with the reaction-inhibiting barrier, thereby both mechanically removing the oxide layer on the first faying surface and preventing oxide re-formation on the first faying surface, is described.

EXAMPLE 9: The connector of Example 1 where the oxide layer on the first faying surface is removed and oxide re-formation on the first faying surface is subsequently prevented by treatment of the first faying surface with an oxide inhibitor selected from the group consisting of silver, copper, zinc, gold, titanium, and chromium is described.

EXAMPLE 10: The connector of Example 3 where the first faying surface is treated with a mechanical oxide disruptor, thereby both mechanically removing the oxide layer on the first faying surface and preventing oxide re-formation on the first faying surface, is described.

EXAMPLE 11: The connector of Example 10 where the mechanical oxide disruptor is selected from the group consisting of zinc, indium, gallium, lead, bismuth, and mercury is described.

EXAMPLE 12: The connector of Example 3 where the first faying surface is contacted by the reaction-inhibiting barrier and then the conduit section is stretched while the first faying surface is in contact with the reaction-inhibiting barrier, thereby both mechanically removing the oxide layer on the first faying surface and preventing oxide re-formation on the first faying surface, is described.

EXAMPLE 13: The connector of Example 3 where the oxide layer on the first faying surface is removed and oxide re-formation on the first faying surface is subsequently prevented by treatment of the first faying surface with an oxide inhibitor selected from the group consisting of silver, copper, zinc, gold, titanium, and chromium is described.

EXAMPLE 14: A method of making a connector for use in an ultra-high vacuum system including the following steps in order: (1) providing a metal conduit section with a first hardness that has a first faying surface and a metal fitting with a second hardness greater than the first hardness that has a second faying surface coated with a reaction-inhibiting barrier material; (2) mechanically disrupting an oxide formed on the first faying surface by treating the first faying surface with a mechanical oxide disruptor; and (3) bonding the first faying surface to the reaction-inhibiting barrier by pressing the fitting coated with the reaction-inhibiting barrier against the first faying surface, thereby sealingly attaching the fitting to the conduit section with the reaction-inhibiting barrier positioned between the fitting and the conduit section; where the reaction-inhibiting barrier substantially inhibits metallic and chemical interaction between the conduit section and the fitting under ultra-high vacuum, temperature cycling, mechanical stress, and reactive chemical conditions; is described.

EXAMPLE 15: The method of Example 14 where the metal conduit section is composed of aluminum, the metal fitting is composed of stainless steel, and the reaction-inhibiting barrier is a titanium or chrome layer is described.

EXAMPLE 16: The method of Example 14 where mechanical oxide disruptor is selected from the group consisting of zinc, indium, gallium, lead, bismuth, and mercury is described.

EXAMPLE 17: The method of Example 15 where the mechanical oxide disruptor is selected from the group consisting of zinc, indium, gallium, lead, bismuth, and mercury is described.

EXAMPLE 18: The method of Example 14 where bonding occurs at temperatures below about 575° C. is described.

EXAMPLE 19: A method of making a connector for use in an ultra-high vacuum system including the following steps in order: (1) providing a metal conduit section with a first hardness that has a first faying surface and a metal fitting with a second hardness greater than the first hardness that has a second faying surface coated with a reaction-inhibiting barrier material; and (2) mechanically disrupting an oxide on the first faying surface and bonding the first faying surface to the reaction-inhibiting barrier by rolling the fitting coated with the reaction-inhibiting barrier against the first faying surface, thereby sealingly attaching the fitting to the conduit section with the reaction-inhibiting barrier positioned between the fitting and the conduit section; where the reaction-inhibiting barrier substantially inhibits metallic and chemical interaction between the conduit section and the fitting under ultra-high vacuum, temperature cycling, mechanical stress, and reactive chemical conditions; and where rolling the fitting coated with the reaction-inhibiting barrier against the first faying surface mechanically disrupts the oxide by stretching the conduit section; is described.

EXAMPLE 20: The method of Example 19 where the metal conduit section is composed of aluminum, the metal fitting is composed of stainless steel, and the reaction-inhibiting barrier is a titanium or chrome layer is described.

EXAMPLE 21: A method of making a connector for use in an ultra-high vacuum system including the following steps in order: (1) providing a metal conduit section with a first hardness that has a first faying surface and a metal fitting with a second hardness greater than the first hardness that has a second faying surface coated with a reaction-inhibiting barrier material; (2) removing an oxide formed on the first faying surface; (3) treating the first faying surface with an oxide inhibitor to prevent oxide re-formation on the faying surface; and (4) bonding the first faying surface of the conduit section to the reaction-inhibiting barrier by pressing or rolling the fitting coated with the reaction-inhibiting barrier against the first faying surface of the conduit section, thereby sealingly attaching the fitting to the conduit section with the reaction-inhibiting barrier positioned between the fitting and the conduit section; where the reaction-inhibiting barrier substantially inhibits metallic and chemical interaction between the conduit section and the fitting under ultra-high vacuum, temperature cycling, mechanical stress, and reactive chemical conditions; is described.

EXAMPLE 22: The method of Example 21 where the metal conduit section is composed of aluminum, the metal fitting is composed of stainless steel, and the reaction-inhibiting barrier is a titanium or chrome layer is described.

EXAMPLE 23: The method of Example 21 where the oxide inhibitor is selected from the group consisting of silver, copper, zinc, gold, titanium, and chromium is described.

EXAMPLE 24: The method of Example 22 where the oxide inhibitor is selected from the group consisting of silver, copper, zinc, gold, titanium, and chromium is described.

EXAMPLE 25: The method of Example 21 where bonding occurs at temperatures below 575° C. is described.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Further, any range of numbers recited above describing or claiming various aspects of the invention, such as ranges that represent a particular set of properties, units of measure, conditions, physical states, or percentages, is intended to literally incorporate any number falling within such range, including any subset of numbers or ranges subsumed within any range so recited. As used herein, the terms "about" and "approximately" when used as modifiers are intended to convey that the numbers and ranges disclosed herein may be flexible as understood by ordinarily skilled artisans and that practice of the disclosed invention by ordinarily skilled artisans using properties that are outside of a literal range will achieve the desired result. The use of "about" or "approximately" as modifiers refers to known commercial and/or experimental measurement variations or tolerances for the referenced quantity. In some embodiments, such known commercial and/or experimental measurement tolerances are ±10% of the measured value, while in other embodiments such known commercial and/or experimental measurement tolerances are ±5% of the measured value, while in still other embodiments such known commercial and/or experimental measurement tolerances are ±2.5% of the measured value, and in still other embodiments, such known commercial and/or experimental measurement tolerances are ±1% of the measured value.

The previous description of the disclosed embodiments is provided to enable any person skilled in the art to make or use the invention disclosed herein. Although the various inventive aspects are disclosed in the context of certain illustrated embodiments, implementations, and examples, it should be understood by those skilled in the art that the invention extends beyond the specifically disclosed embodiments to other alternative embodiments and/or uses of the invention and obvious modifications and equivalents thereof. In addition, while a number of variations of various inventive aspects have been shown and described in detail, other modifications that are within their scope will be readily apparent to those skilled in the art based upon reviewing this disclosure. It should be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. The generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Each of the foregoing and various aspects, together with those summarized above or otherwise disclosed herein, including the figures, may be combined without limitation to form claims for a device, apparatus, system, method of manufacture, and/or method of use. All references cited herein are hereby expressly incorporated by reference.

What is claimed is:

1. A method of making a connector for use in an ultra-high vacuum system comprising the following steps in order:
   a. providing a metal conduit section with a first hardness that has a first faying surface and a metal fitting with a second hardness greater than the first hardness that has a second faying surface coated with a reaction-inhibiting barrier material;
   b. mechanically disrupting an oxide formed on the first faying surface by treating the first faying surface with a mechanical oxide disruptor; and
   c. bonding the first faying surface to the reaction-inhibiting barrier by pressing the fitting coated with the reaction-inhibiting barrier against the first faying surface, thereby sealingly attaching the fitting to the conduit section with the reaction-inhibiting barrier positioned between the fitting and the conduit section;
wherein the reaction-inhibiting barrier inhibits metallic and chemical interaction between the conduit section and the fitting at least to an extent that the connector is suitable for use under ultra-high vacuum, temperature cycling, mechanical stress, and reactive chemical conditions, and
wherein the mechanical oxide disruptor is selected from the group consisting of zinc, indium, gallium, lead, bismuth, and mercury.

2. The method of claim 1, wherein the metal conduit section is composed of aluminum, the metal fitting is composed of stainless steel, the reaction-inhibiting barrier is a titanium or chrome layer, and the mechanical oxide disruptor is selected from the group consisting of zinc, indium, gallium, lead, bismuth, and mercury.

3. The method of claim 1, wherein bonding occurs at temperatures below 575° C.

4. A method of making a connector for use in an ultra-high vacuum system comprising the following steps in order:
   a. providing a metal conduit section with a first hardness that has a first faying surface and a metal fitting with a second hardness greater than the first hardness that has a second faying surface coated with a reaction-inhibiting barrier material; and
   b. mechanically disrupting an oxide on the first faying surface and bonding the first faying surface to the reaction-inhibiting barrier by rolling the fitting coated with the reaction-inhibiting barrier against the first faying surface, thereby sealingly attaching the fitting to the conduit section with the reaction-inhibiting barrier positioned between the fitting and the conduit section;
wherein the reaction-inhibiting barrier inhibits metallic and chemical interaction between the conduit section and the fitting at least to an extent that the connector is suitable for use under ultra-high vacuum, temperature cycling, mechanical stress, and reactive chemical conditions; and
wherein rolling the fitting coated with the reaction-inhibiting barrier against the first faying surface mechanically disrupts the oxide by stretching the conduit section.

5. The method of claim 4, wherein the metal conduit section is composed of aluminum, the metal fitting is composed of stainless steel, and the reaction-inhibiting barrier is a titanium or chrome layer.

6. A method of making a connector for use in an ultra-high vacuum system comprising the following steps in order:
   a. providing a metal conduit section with a first hardness that has a first faying surface and a metal fitting with a second hardness greater than the first hardness that has a second faying surface coated with a reaction-inhibiting barrier material;
   b. removing an oxide formed on the first faying surface;
   c. treating the first faying surface with an oxide inhibitor to prevent oxide re-formation on the faying surface; and
   d. bonding the first faying surface of the conduit section to the reaction-inhibiting barrier by pressing or rolling the fitting coated with the reaction-inhibiting barrier against the first faying surface of the conduit section, thereby sealingly attaching the fitting to the conduit section with the reaction-inhibiting barrier positioned between the fitting and the conduit section;
wherein the reaction-inhibiting barrier inhibits metallic and chemical interaction between the conduit section and the fitting at least to an extent that the connector is suitable for use under ultra-high vacuum, temperature cycling, mechanical stress, and reactive chemical conditions.

7. The method of claim 6, wherein the metal conduit section is composed of aluminum, the metal fitting is composed of stainless steel, and the reaction-inhibiting barrier is a titanium or chrome layer.

8. The method of claim 7, wherein the oxide inhibitor is selected from the group consisting of silver, copper, zinc, gold, titanium, and chromium.

9. The method of claim 6, wherein the oxide inhibitor is selected from the group consisting of silver, copper, zinc, gold, titanium, and chromium.

10. The method of claim 6, wherein bonding occurs at temperatures below 575° C.

* * * * *